United States Patent
Wills

(10) Patent No.: US 6,288,826 B1
(45) Date of Patent: Sep. 11, 2001

(54) MULTI-STAGE OPTICAL ISOLATOR

(75) Inventor: Gonzalo Wills, Ottawa (CA)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/477,702

(22) Filed: Jan. 5, 2000

(51) Int. Cl.[7] .................................................. G02B 5/30
(52) U.S. Cl. ...................... 359/282; 359/484; 359/495; 359/497
(58) Field of Search .................... 359/484, 495, 359/497, 281, 282; 372/703; 385/11

(56) References Cited

U.S. PATENT DOCUMENTS

| | | | |
|---|---|---|---|
| 4,974,944 | * 12/1990 | Chang | 359/484 |
| 5,151,955 | * 9/1992 | Ohta et al. | 385/11 |
| 5,204,771 | * 4/1993 | Koga | 359/495 |
| 5,237,445 | * 8/1993 | Kuzuta | 359/484 |
| 5,381,261 | * 1/1995 | Hirai et al. | 372/703 |
| 5,402,509 | * 3/1995 | Fukushima | 385/11 |
| 5,446,578 | * 8/1995 | Chang et al. | 359/497 |
| 5,566,259 | 10/1996 | Pan et al. | 385/11 |
| 5,581,640 | 12/1996 | Pan et al. | 385/11 |
| 5,706,371 | 1/1998 | Pan | 385/11 |
| 5,835,270 | * 11/1998 | Urino et al. | 359/484 |
| 5,973,832 | * 10/1999 | Bettman | 359/484 |
| 6,028,702 | * 2/2000 | Sasaki | 359/497 |
| 6,055,101 | * 4/2000 | Bergmann et al. | 359/484 |

FOREIGN PATENT DOCUMENTS

| | | | |
|---|---|---|---|
| 0122624 | * 6/1986 | (JP) | 359/484 |
| 0044310 | * 2/1990 | (JP) | 359/484 |
| 0091715 | * 4/1991 | (JP) | 359/484 |
| 404264515 | * 9/1992 | (JP) | 359/484 |
| 6-34915 | * 2/1994 | (JP) | 359/484 |

* cited by examiner

*Primary Examiner*—Ricky D. Shafer
(74) *Attorney, Agent, or Firm*—Neil Teitelbaum

(57) ABSTRACT

This invention discloses to a multi-stage optical isolator having a large centrally disposed birefringent crystal and two smaller crystals sized to separate in a polarization dependent manner into sub-beams and combine light that is separated into sub-beams at an output end thereof. By providing a single large crystal centrally disposed, less alignment is required due to fewer alignment critical components being required. Furthermore, the isolator in accordance with this invention is well suited to high-power applications.

7 Claims, 4 Drawing Sheets

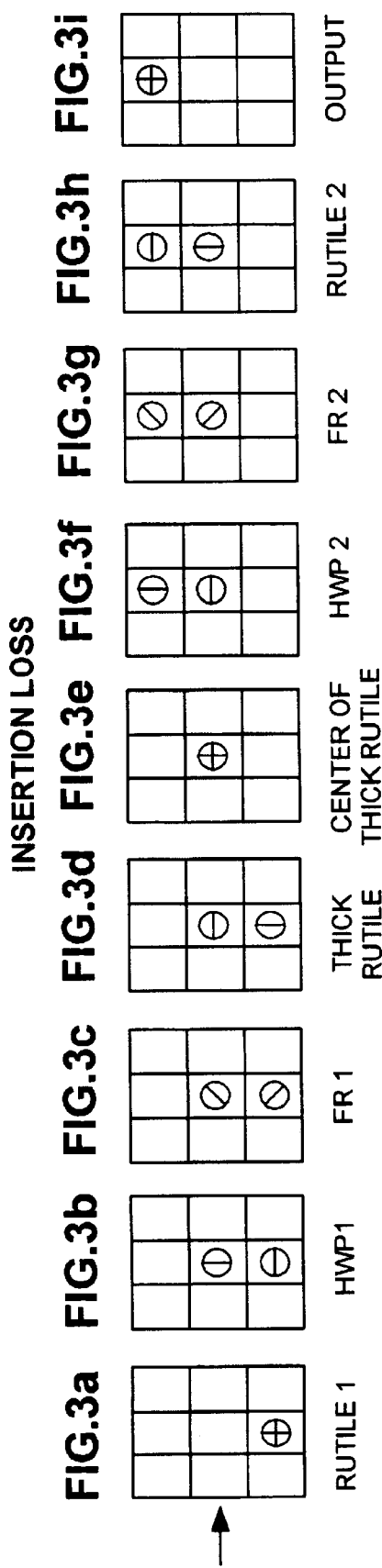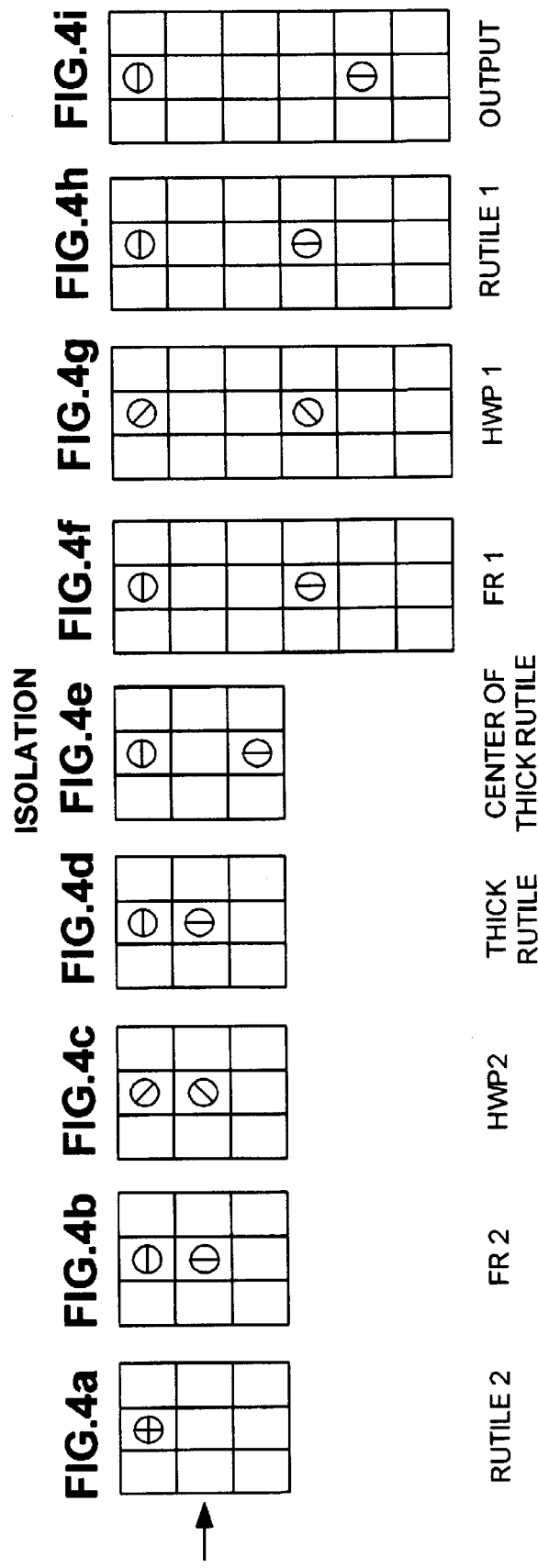

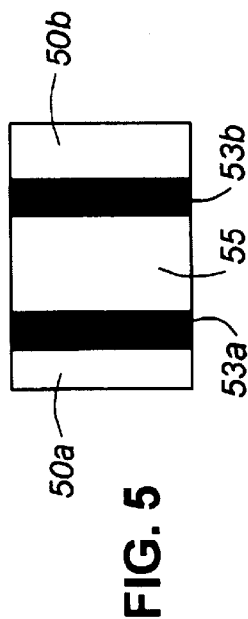
FIG. 5
INSERTION LOSS
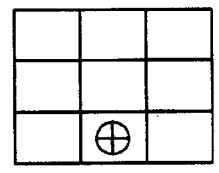 FIG. 6a RUTILE 1
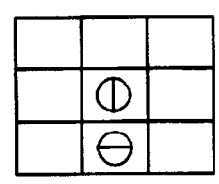 FIG. 6b FR 1
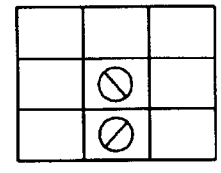 FIG. 6c THICK RUTILE
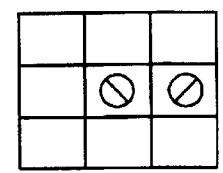 FIG. 6d FR 2
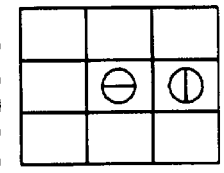 FIG. 6e RUTILE 2
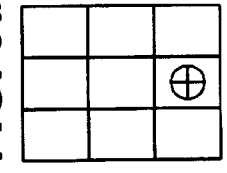 FIG. 6f OUTPUT
ISOLATION
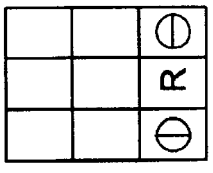 FIG. 7a RUTILE 2
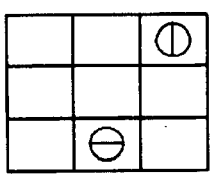 FIG. 7b FR 1
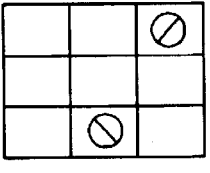 FIG. 7c THICK RUTILE
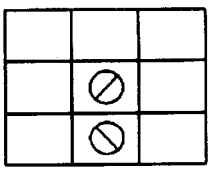 FIG. 7d FR 1
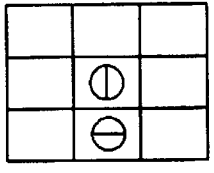 FIG. 7e RUTILE 1
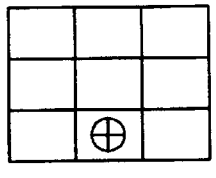 FIG. 7f OUTPUT

MULTI-STAGE OPTICAL ISOLATOR

FIELD OF THE INVENTION

This invention relates generally to a multi-stage optical isolator and more particularly to an at least two stage optical isolator that requires only a single birefringent element between two non-reciprocal rotating elements.

BACKGROUND OF THE INVENTION

Optical isolators are used in a variety of applications in optical communication systems. Generally, optical isolators are used to prevent reflective portions of transmitted signals from re-entering the transmitting device. Many older prior art designs prevent reflections from re-entering a transmitting device in a polarization-selective manner. However, in certain circumstances where a transmission system causes uncontrollable changes in polarization, the polarization state of a signal may be unknown, and thus, these earlier polarization dependent designs are not considered to be practical. Thus, as of late, a large effort has been undertaken to develop an isolator that is polarization independent. It is also desired to have an optical isolator that is capable of isolating high power optical signals without compromising the longevity of the isolator.

One prior art polarization independent optical isolator is described in U.S. Pat. No. 5,033,830 issued Jul. 23, 1991 in the name of Jameson and entitled Polarization Independent Optical Isolator. Jameson describes an isolator having a single birefringent plate, a pair of stacked reciprocal rotators, a Faraday rotator, and a reflector positioned in tandem adjacent to the birefringent plate. In a forward (transmitting) direction, a lightwave signal exiting an optical fiber is split into a pair of orthogonal rays by the birefringent plate. The orthogonal rays then pass through a first reciprocal rotator and the Faraday rotator which provides 22.5° of rotation. The rotated rays are then redirected by the reflector back though the Faraday rotator. After passing through the second reciprocal rotator, the orthogonal rays re-enter the same birefringent plate where they are recombined and launched in an output fiber. Since a Faraday rotator is a non-reciprocal device, any signal traveling through the isolator in the reverse (isolation) direction will be split on both passes through the birefringent plate such that neither will intercept the input fiber. In practice, Jameson's single stage isolator described above, may provide adequate isolation; however, in some instances, increased isolation may be required. Such additional isolation has been known to be provided by using a multi-stage optical isolating device; generally these multi-stage devices are costly to manufacture often requiring nearly double the number of optical components that a single stage device requires; more importantly, aligning nearly twice as many components with one another can be difficult, time-consuming, costly, and generally increase the overall alignment error.

For example, U.S. Pat. No. 5,581,640 in the name Pan et al. Assigned to E-tek Dynamics, Inc. describes a multi-stage optical isolator wherein two polarizers in the form of a birefringent crystal wedges of lithium niobate are used as the birefringent material of the polarizers. The polarizers in prior art FIG. 1 (shown as FIG. 6A of the '640 patent) are shown as spaced-apart crystal wedges having complementary slanted faces. However, it is not clear from the specification whether the space between the optical elements, shown between all of the elements in the device, is merely for the purpose of illustration. For example, if the gapped end faces of elements 64*a* and 64*b* in FIG. 1 are air gapped, then the end faces would likely require anti-reflection (AR) coating.

The instant invention obviates both the requirement of AR coating two crystals disposed between two non-reciprocal polarization rotating elements, and, obviates using two such crystals, thereby obviating the requirement for adhesive between such crystals.

Since the instant invention obviates the requirement of two crystals disposed between two non-reciprocal polarization rotating elements, it thereby obviates the complex and difficult component alignment that is required when using two such crystals are in tandem in a multi-stage isolator.

It is an object of this invention to provide a relatively low-cost optical isolator that is particularly well suited to carrying high-power optical signals.

SUMMARY OF THE INVENTION

In accordance with the invention, there is provided, a multi-stage optical isolator having at least two stages, comprising:

an input birefringent crystal for splitting an input beam into two orthogonally polarized sub-beams;

an output birefringent crystal for combining two orthogonally polarized beams into a single output beam at an output end thereof;

first rotating means for rotating the polarization of the beams received from an output end of the input birefringent crystal;

second rotating means for rotating the polarization of the beams directed to the input end of the output birefringent crystal; and a centrally disposed birefringent crystal substantially equal to the sum of the thicknesses of the input and the output crystals, disposed between the first and second rotating means for merging two rotated beams received from the first rotating means, and for diverging said beams after they combine therein to provide two separated beams to the second rotating means.

In accordance with the invention, a two stage optical isolator is provided having two birefringent crystals, one at each end thereof, each having a thickness of "t", two at least non-reciprocal rotators disposed between the two birefringent crystals; and a single birefringent crystal having a thickness of substantially at disposed between the two non-reciprocal rotators.

In accordance with the invention, a two stage optical isolator, having less than four birefringent crystals, comprise a centrally disposed birefringent crystal; two non-reciprocal rotating means, one on each side of said centrally disposed birefringent crystal; and two other birefringent crystals, one on each end of the two stage optical isolator, for respectively splitting and combining two orthogonally polarized beams; wherein the centrally disposed birefringent crystal is thicker that the combined thickness of the two other birefringent crystals; and wherein the thickness of the centrally disposed crystal is such that when two separated beams orthogonally polarized by a distance "d" received from one of the other birefringent crystals are launched into the centrally disposed crystal, the two beams converge and subsequently diverge within the centrally disposed crystal to exit the centrally disposed crystal having a separation "d".

Advantageously, the isolator in accordance with this invention is found to provide a high degree of isolation of an incoming optical signal with less overall cost per device.

Advantageously the isolator in accordance with this invention is well suited to isolating high-power optical signals.

BRIEF DESCRIPTION OF THE DRAWINGS

Exemplary embodiments of the invention will now be described in conjunction with the accompanying drawings in which:

FIGS. 3a through 3i illustrate the state of an input beam as it becomes divided in a polarization dependent manner and as its polarization is rotated;

FIGS. 4a through 4i illustrate the state of a beam launched backward into the device of FIG. 3i and illustrates the isolation achieved;

FIG. 5 is a side view of a double stage isolator consisting of two non-reciprocal rotating elements and three crystals, wherein a centrally disposed crystal is substantially thicker than input and output crystals;

FIGS. 6a through 6f illustrate the state of an input beam as it becomes divided in a polarization dependent manner and as its polarization is rotated as it travels through the device shown in FIG. 5;

FIGS. 7a through 7f illustrate the state of a beam launched backward into the device of FIG. 5 and illustrates the isolation achieved;

DETAILED DESCRIPTION

Figure 1:
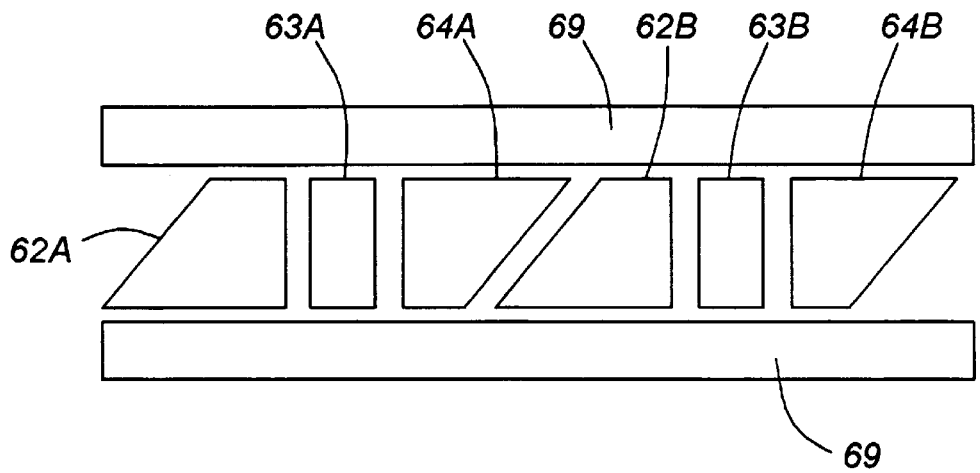
FIG. 1 is a side view of a prior art dual-stage optical isolator.

Referring now to prior art FIG. 1 a two-stage polarization independent optical isolator is shown having oppositely oriented lithium niobate crystals 62A and 64B at opposite ends, and having Faraday rotators 63A and 63B disposed inside of crystals 62A and 64B. Sandwiched between the two Faraday rotators 63A and 63B are two crystals 64A and 62B having complementary slanted inwardly facing end faces. This arrangement of components is quite typical; in order to provide isolation independent of the state of incoming light, the incoming beam must be separated into two sub-beams having two orthogonal polarizations and, the two beams must pass through a non-reciprocal rotator after which the beams must be recombined. This occurs within components 62A, 63A, and 64A. The second stage of isolation is afforded by replicating this via components 62B, 63B and 64B, which are aligned with the components 62A, 63A and 64A in a housing 69.

Figure 2A:
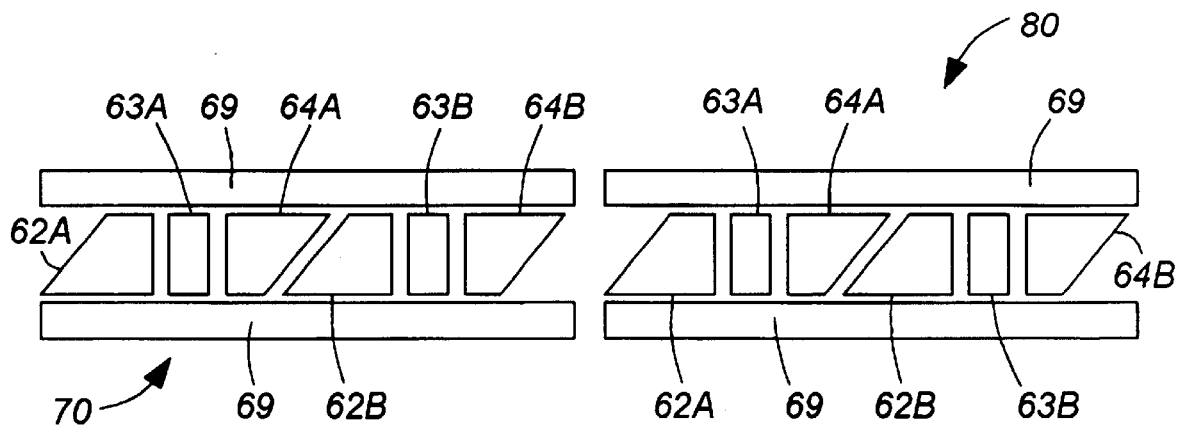
FIG. 2a is a side view of a prior art four-stage optical isolator.

Similarly, the four-stage device shown in FIG. 2a illustrates the same type of device wherein a second two-stage device 80 is provided after the first two-stage isolator 70.

As was mentioned above, when an air gap is provided between component end faces, an AR coating is typically required.

Figure 2B:
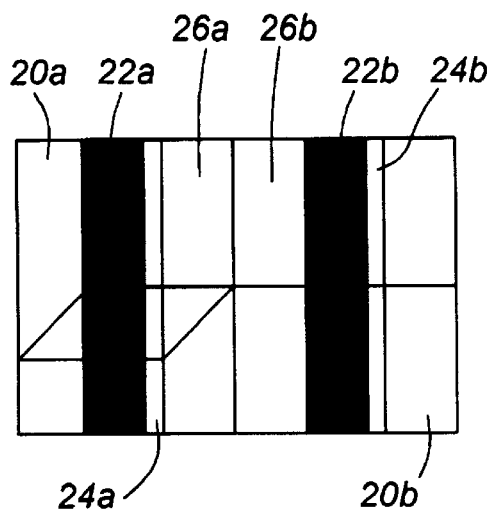
FIG. 2b is a side view of another prior art two-stage isolator.
Figure 2C:
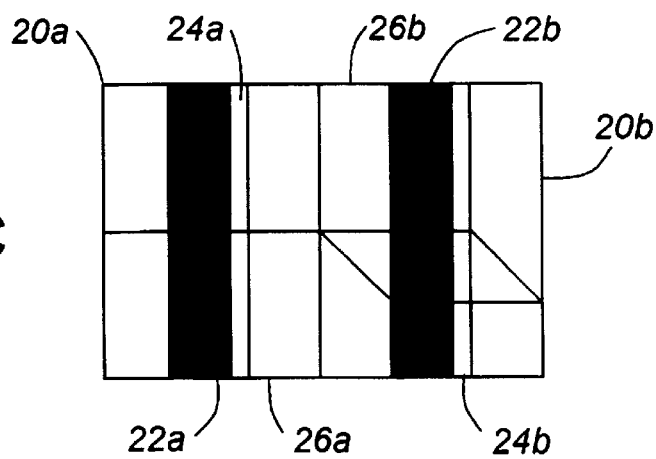
FIG. 2c is a top view of the isolator shown in FIG. 2b.

FIGS. 2b and 2c illustrate another isolator wherein two single stage isolators, including rutile crystals 20a and 20b, half-wave plates 22a and 22b, and non-reciprocal rotators 24a and 24b, have their output and input crystals 26a and 26b respectively joined.

Figure 3:
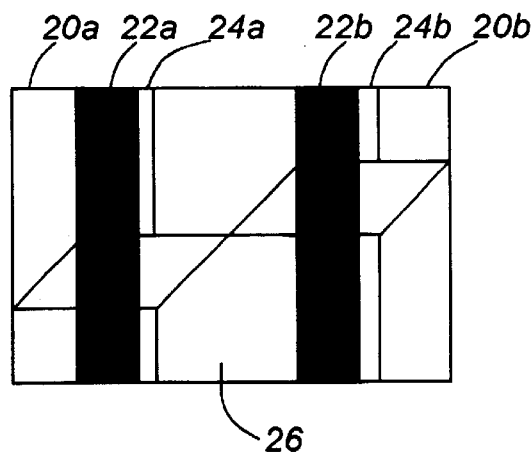
FIG. 3 is a side view of a two-stage optical isolator in accordance with a preferred embodiment of the invention.

Turning now to FIG. 3, a preferred embodiment of a two-stage optical isolator in accordance with the invention is shown having two rutile crystals 20a and 20b for separating an incoming beam into two orthogonally polarized sub-beams and, for combining two orthogonally polarized sub-beams into a single output beam, respectively. Between the crystals 20a and 20b are two half-wave plates 22a and 22b, and two non-reciprocal rotators 24a and 24b in the form of Faraday rotators. A rutile crystal 26 having a thickness of substantially about equal to the combined thickness of the rutile crystals 20a and 20b is located centrally between the Faraday rotators 24a and half-waveplate 22b. In operation when the incoming beam incident upon the rutile crystal 20a is separated into the two orthogonally polarized sub-beams, the beams first pass through the reciprocal rotating half-wave plate 24a and are rotated by 45°. Subsequently as the beams propagate toward the output end of the device after traversing the plate 24a, they are simultaneously rotated a second time in a same direction by another 45°. The beams then enter the thick crystal 26 and converge/combine and focus at a location substantially about halfway along the fast axis of the crystal. In contrast to conventional two-stage isolators which at this stage launch the combined beams into a second isolator chip, the beams in this instance, after combining, splitting from one another by crossing over each other and continuing along their original paths. The two beams are each subsequently, simultaneously rotated 45° by the second half-wave plate 22b and are then rotated by the Faraday rotator 24b, afterwhich they are combined by the last rutile crystal 20b at an output port.

The advantages of utilizing the single crystal 26 as opposed to the two crystals 64A and 62B as shown in prior art FIG. 1, are numerous. When two crystals are used, and lateral or longitudinal alignment is not perfect isolation may be lessened.

Conveniently, by using a single crystal these drawbacks are obviated, and when a high power optical signal is focused substantially about the centre of the single crystal 26 along its fast axis, the difficulty of focusing the beam at the interface of two crystals is avoided.

Referring now to FIGS. 3a through 3i, a transmission path is defined from the input port through elements 20a, 22a, 24a, 26, 24b, 22b, and 20b to the output port (from left to right). In an alternative embodiment (not shown), the order of the reciprocal and non-reciprocal rotators may be reversed.

Calcite or rutile crystals are preferably used for the above refraction crystal plates 20a 20b and 26. The non-reciprocal rotators are preferably a Faraday rotating elements 24a, 24b that uses a Y.I.G crystal or Bi-added thin film crystal. The composition of the Bi-added thin film crystals include a combination of, for example, $(YbTbBi)_3Fe_5O_{12}$ and $(GdBi)_3(GeAlGa)_5O_{12}$, or of Y.I.G. and $Y_{3x}Bi_xFe_5O_{12}$.

Next, in conjunction with FIGS. 3a through 3i, the detailed operation of the device will now be described. Light entering the rutile 20a is followed and explained as it enters and exits each optical element on its forward path through the device (shown as left-to-right). Looking at the end face of the rutile (labeled rutile 1) in FIG. 3a, the light is shown in a lower central position as a single beam having an unknown polarization state. After traversing the rutile crystal 20a, the beam is divided into two sub-beams (o-ray and e-ray) and are incident upon the first half-wave plate (HWP1) 22a where they are rotated by 45° shown in FIG. 3c. The two beams subsequently traverse the first Faraday rotator FR1 24a where they are rotated again by 45° shown in FIG. 3d as the beams enter the thick rutile 26. After propagating halfway through the thick rutile 26, the beams converge and focus about the centre of 26 as shown in FIG. 3e. The beams then diverge in a polarization dependent manner to become two separated orthogonal beams at the shown entering the second half-wave plate HWP2 22b in FIG. 3f. The beams are then rotated 22b as shown entering FR2 24b in FIG. 3g. The beams rotated a second time by 24b are shown entering the rutile crystal 20b. FIG. 3i illustrates the output end of the rutile 20b where the beams have recombined to be output in a conventional manner via a lens such as a rod graded index (GRIN) lens to an optical fibre.

Turning now to FIGS. 4a through 4i, isolation is illustrated by use of the diagrams. For example, when light is launched into the second rutile and back reflected light might be, the beam is split by the rutile crystal 20b into two sub-beams shown in FIG. 4b as entering FR2 24b. FIG. 4c illustrates the beam rotated clockwise by 45° at the input end face of HWP2 22b. After passing through HWP2 22b, the beam is rotated counter clockwise by 45° as is shown at the input face of the thick rutile 26 in FIG. 4d completing a first stage of isolation.

The second stage of isolation continues from the midsection of the rutile 26 wherein the two separated beams further separate as shown in FIG. 4f at the input face of FR1 24a. After rotation of 45° by FR1 24a and a 45° rotation by the rutile 22a, the beams are shown separated by a large distance affording high isolation.

FIG. 5 illustrates another embodiment of the invention wherein the isolating portion of a double stage isolator consists of an input rutile crystal 50a (rutile1), a first Faraday rotator 53a FR1 a thicker centrally disposed rutile crystal 55, followed by a second Faraday rotator 53b FR2 followed by an output rutile crystal 50b (rutile2). For simplicity and clarity collimating/focusing input/output lenses are not shown.

Referring now to FIGS. 6a through 6f, states of polarization are shown for an input beam as it is launched into an input end of the isolator and propagates through to the output end. After the beam exits the rutile1 50a in FIG. 6a, it is split into two orthogonally polarized sub-beams shown at the input end of the Faraday rotator FR1 53a in FIG. 6b. After being rotated the beam is shown in FIG. 6c at the input end of the thick rutile 55. The beam is then shifted by the rutile 55 as shown at the input face of the Faraday rotator FR2 in FIG. 6d. The beam is then rotated by the rotator 53b and is shown at the input face of the rutile2 in FIG. 6e. The output rutile crystal 50b joins the two beams into a single beam as shown at the output end in FIG. 6f.

FIGS. 7a through 7f shows a sequence of polarization states for beam of light launched into the isolator backwards toward the input end from the rutile crystal 50b toward the rutile crystal 50a. FIG. 7f shows two separated beams that are disposed a distance away from the "real" input port, denoted "R".

Of course, the two-stage optical isolator shown can be used as a part of an n-stage optical isolator wherein n>2.

In summary, the optical isolator in accordance with this invention provides high power handling capacity since the light traversing the device is focused inside the crystal; polarization dependent loss is lessened due to high tolerance; and, insertion loss is lessened due to any mismatch that may otherwise occur between rutile crystals in conventional devices having two centrally disposed crystals; and a high extinction ratio is obtained. Furthermore, all of the above advantages are achieved using a device which is less costly to manufacture than a conventional two-stage isolator.

Numerous other embodiments may be envisaged, without departing from the spirit and scope of the invention.

What I claim is:

1. A multi-stage optical isolator having at least two stages, comprising:

an input birefringent crystal for splitting an input beam into two orthogonally polarized sub-beams;

an output birefringent crystal for combining two orthogonally polarized beams into a single output beam at an output end thereof;

first rotating means for rotating the polarization of the beams received from an output end of the input birefringent crystal;

second rotating means for rotating the polarization of the beams directed to the input end of the output birefringent crystal; and a centrally disposed crystal substantially equal to the sum of the thicknesses of the input and output birefringent crystals, disposed between the first and second rotating means for merging two rotated beams received from the first rotating means, and for splitting said beams after they merge therein to provide two separated beams to the second rotating means.

2. A multi-stage optical isolator as defined in claim 1, wherein the first and second rotating means each comprise a reciprocal rotator and a non-reciprocal rotator.

3. A multi-stage optical isolator as defined in claim 1, wherein the centrally disposed crystal has a length, in a principal direction along which the light propagates from the input birefringent crystal to the output birefringent crystal, that is substantially about equal to the length of the input birefringent crystal plus the length of the output birefringent crystal.

4. A multi-stage optical isolator as defined in claim 3, wherein the birefringent crystals are rutile crystals.

5. A multi-stage optical isolator as defined in claim 1, wherein a two-stage portion of the at least two-stage isolator consists of only three birefringent crystals.

6. A multi-stage optical isolator as defined in claim 5, wherein the birefringent crystals are rutile crystals.

7. A two-stage optical isolator comprising two birefringent crystals, one at each end thereof, each having a thickness of at least "t"; at least two non-reciprocal rotators disposed between the two birefringent crystals; and a single birefringent crystal having a thickness of substantially "2t" disposed between the two non-reciprocal rotators, the optical isolator further comprising two reciprocal rotators, each disposed on a different side of the single birefringent crystal in between the two birefringent crystals.

* * * * *

UNITED STATES PATENT AND TRADEMARK OFFICE
CERTIFICATE OF CORRECTION

PATENT NO. : 6,288,826 B1
DATED : September 11, 2001
INVENTOR(S) : Wills

It is certified that error appears in the above-identified patent and that said Letters Patent is hereby corrected as shown below:

<u>Column 2,</u>
Line 41, "at" should read -- 2t --
Line 52-53, "separated beams orthogonally polarized" should read -- orthogonally polarized beams separated --

Signed and Sealed this

Seventh Day of May, 2002

Attest:

Attesting Officer

JAMES E. ROGAN
*Director of the United States Patent and Trademark Office*